United States Patent
Masuda

(10) Patent No.: US 10,807,577 B2
(45) Date of Patent: Oct. 20, 2020

(54) POWERED BRAKE DEVICE

(71) Applicant: NTN CORPORATION, Osaka (JP)

(72) Inventor: Yui Masuda, Iwata (JP)

(73) Assignee: NTN CORPORATION, Osaka (JP)

( * ) Notice: Subject to any disclaimer, the term of this patent is extended or adjusted under 35 U.S.C. 154(b) by 217 days.

(21) Appl. No.: 15/915,829

(22) Filed: Mar. 8, 2018

(65) Prior Publication Data

US 2018/0194334 A1 Jul. 12, 2018

Related U.S. Application Data

(63) Continuation of application No. PCT/JP2016/076074, filed on Sep. 6, 2016.

(30) Foreign Application Priority Data

Sep. 10, 2015 (JP) .................. 2015-178188

(51) Int. Cl.
*B60T 8/1761* (2006.01)
*F16D 65/18* (2006.01)
(Continued)

(52) U.S. Cl.
CPC ............ *B60T 8/1761* (2013.01); *B60T 8/172* (2013.01); *B60T 8/173* (2013.01); *B60T 8/32* (2013.01);
(Continued)

(58) Field of Classification Search
CPC ........ B60T 8/1761; B60T 8/172; B60T 8/173; B60T 8/32; B60T 13/74; B60T 13/741; F16D 65/18; F16D 66/00; H02P 27/00
See application file for complete search history.

(56) References Cited

U.S. PATENT DOCUMENTS 5,074,371 A * 12/1991 Shibayama .......... B60K 31/047
180/175
6,496,768 B2 12/2002 Yamamoto
(Continued)

FOREIGN PATENT DOCUMENTS

| CN | 102101472 A | 6/2011 |
| JP | 6-327190 | 11/1994 |

(Continued)

OTHER PUBLICATIONS

International Search Report dated Dec. 13, 2016 in corresponding International Patent Application No. PCT/JP2016/076074.
(Continued)

*Primary Examiner* — Behrang Badii
*Assistant Examiner* — Daniel L Greene

(57) ABSTRACT

An electric brake device selectively using, based on requests, a control scheme that reduces torque variation and a control scheme that maximizes a torque to provide a quiet operation with smaller torque variation for prioritizing Noise Vibration Harshness and a high torque operation or high output operation for prioritizing torque or output. A motor current calculator selectively uses an output prioritizing control scheme that prioritizes a torque output and a torque variation suppressing control scheme that prioritizes smaller torque variation. An output requirement determiner calculates a degree of importance of suppressing torque variation of an electric motor, based on one or both of a braking request and a travel condition of a vehicle. In accordance with this determination result, the motor current calculator selectively uses the output prioritizing control scheme and the torque variation suppressing control scheme.

7 Claims, 9 Drawing Sheets

(51) Int. Cl.
  *B60T 13/74* (2006.01)
  *H02P 27/00* (2006.01)
  *F16D 66/00* (2006.01)
  *B60T 8/173* (2006.01)
  *B60T 8/172* (2006.01)
  *B60T 8/32* (2006.01)
  *F16D 121/24* (2012.01)

(52) U.S. Cl.
  CPC ............ *B60T 13/74* (2013.01); *B60T 13/741* (2013.01); *F16D 65/18* (2013.01); *F16D 66/00* (2013.01); *H02P 27/00* (2013.01); *F16D 2121/24* (2013.01)

(56) References Cited

U.S. PATENT DOCUMENTS

| | | | |
|---|---|---|---|
| 7,810,616 B2 | 10/2010 | Nakazeki | |
| 8,573,709 B2 | 11/2013 | Suzuki et al. | |
| 8,985,283 B2 | 3/2015 | Oshio et al. | |
| 9,475,471 B2 | 10/2016 | Yasui et al. | |
| 9,856,936 B2 | 1/2018 | Masuda | |
| 2002/0026272 A1 | 2/2002 | Yamamoto | |
| 2004/0008530 A1* | 1/2004 | Kitahata | H02M 5/458 363/131 |
| 2004/0220015 A1* | 11/2004 | Murakami | F16H 3/728 477/15 |
| 2007/0035272 A1* | 2/2007 | Hattori | H02P 6/20 318/823 |
| 2008/0110704 A1 | 5/2008 | Nakazeki | |
| 2009/0278352 A1* | 11/2009 | Rivas | F03D 7/0224 290/44 |
| 2011/0148184 A1 | 6/2011 | Suzuki et al. | |
| 2012/0285777 A1 | 11/2012 | Oshio et al. | |
| 2013/0013159 A1* | 1/2013 | Moriki | B66F 9/20 701/50 |
| 2013/0063061 A1* | 3/2013 | Hanada | H02P 27/08 318/400.14 |
| 2015/0151727 A1 | 6/2015 | Yasui et al. | |
| 2015/0311852 A1* | 10/2015 | Urata | H02P 6/14 318/400.2 |
| 2016/0178021 A1 | 6/2016 | Masuda | |
| 2016/0297414 A1 | 10/2016 | Yasui | |

FOREIGN PATENT DOCUMENTS

| | | |
|---|---|---|
| JP | 2002-67906 | 3/2002 |
| JP | 2006-194356 | 7/2006 |
| JP | 2011-173521 | 9/2011 |
| JP | 2012-65424 | 3/2012 |
| JP | 2013-133002 | 7/2013 |
| JP | 2015-51729 | 3/2015 |
| JP | 2015-120416 | 7/2015 |

OTHER PUBLICATIONS

Japanese Office Action dated May 21, 2019 in corresponding Japanese Patent Application No. 2015-178188.
English Translation by WIPO of the International Preliminary Report on Patentability dated Mar. 22, 2018, in corresponding International Patent Application No. PCT/JP2016/076074, 8 pgs.
Extended European Search Report dated Mar. 25, 2019 in corresponding European Patent Application No. 16844322.4 (7 pages).
Office Action, dated Dec. 4, 2019, in Chinese Application No. 201680052231.4 (17 pp.).
Office Action, dated Jul. 14, 2020, in corresponding Chinese Application No. 201680052231.4 (8 pp.).

* cited by examiner

Fig. 4

| VEHICLE SPEED | | TORQUE VARIATION | OUTPUT CHARACTERISTICS |
|---|---|---|---|
| | AT STOPPAGE | VERY IMPORTANT | VERY IMPORTANT |
| | LOW | VERY IMPORTANT | LESS IMPORTANT |
| | NORMAL | IMPORTANT | IMPORTANT |
| | HIGH | LESS IMPORTANT | IMPORTANT |
| TARGET BRAKE FORCE | SMALL | IMPORTANT | LESS IMPORTANT |
| | INTERMEDIATE | IMPORTANT | IMPORTANT |
| | LARGE | IMPORTANT | VERY IMPORTANT |
| RATE OF CHANGE OF TARGET BRAKE FORCE | SMALL | LESS IMPORTANT | LESS IMPORTANT |
| | INTERMEDIATE | VERY IMPORTANT | IMPORTANT |
| | LARGE | IMPORTANT | VERY IMPORTANT |

Fig. 7
(A)
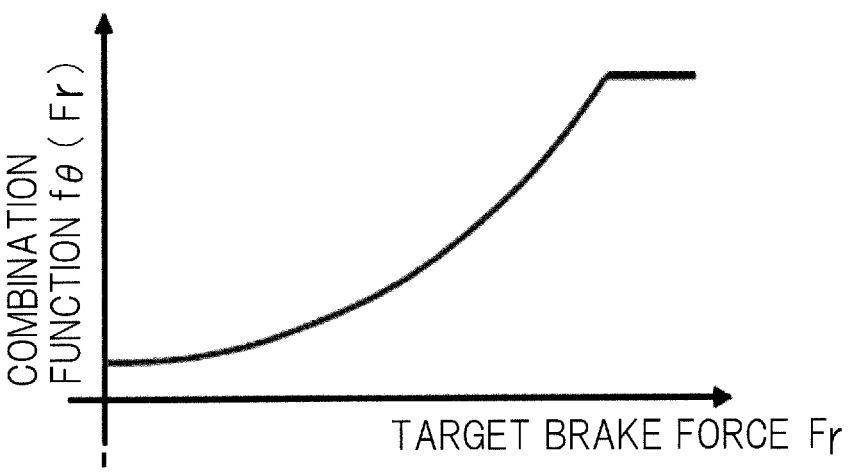
(B)
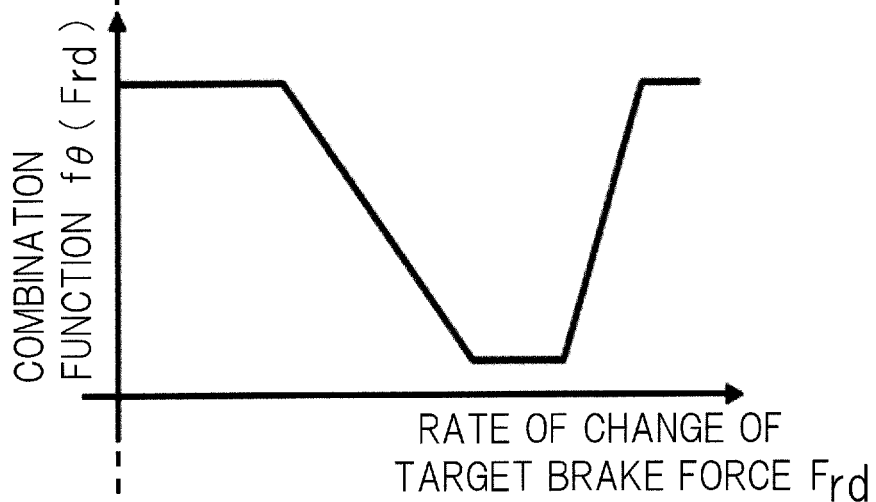
(C)
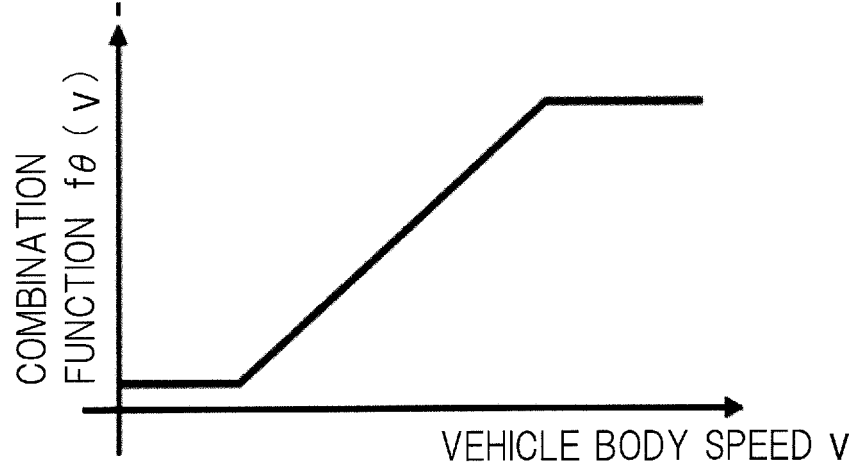

POWERED BRAKE DEVICE

CROSS REFERENCE TO THE RELATED APPLICATION

This application is a continuation application, under 35 U.S.C. § 111(a), of international application No. PCT/JP2016/076074, filed Sep. 6, 2016, which is based on and claims Convention priority to Japanese patent application No. 2015-178188, filed Sep. 10, 2015, the entire disclosure of which is herein incorporated by reference as a part of this application.

BACKGROUND OF THE INVENTION

Field of the Invention

The present invention relates to a powered brake device or electric brake device to be installed to a vehicle such as an automotive vehicle.

Description of Related Art

The following designs have been proposed for an electric brake device:

(i) a design with an electric brake actuator that includes an electric motor, a linear motion mechanism and a reduction gear or speed reducer (see, for example, Patent Document 1); and (ii) a design with an electric brake actuator that includes a planetary roller mechanism and an electric motor (see, for example, Patent Document 2).

RELATED DOCUMENT

Patent Document

[Patent Document 1] JP Laid-Open Patent Publication No. H06-327190

[Patent Document 2] JP Laid-Open Patent Publication No. 2006-194356

In an electric brake device such as those disclosed in Patent Documents 1 and 2, reduction of torque variation of an electric motor may be desired for the purpose of enhancing control precision and improving NVH (Noise Vibration Harshness). As far as reduction of such torque variation in an electric servo motor system like an electric brake device is concerned, the torque variation frequency depends on the angular velocity of the motor and may range from a stationary state of the motor—that is, the frequency is 0 Hz—to a frequency corresponding to a multiple of the maximum angular velocity of the motor (which depends on the torque variation period), so it works as a disturbance having a wide range of frequencies. This may make it quite difficult to reduce the effects of torque variation through the use of controllers.

Normally, a motor with smaller torque variation can only be constructed at the cost of a lower torque density. For example, the attempts to reduce torque variation by means of skewing or non-concentric geometry of magnets may generally result in the formation of complicated shapes and may decrease the effective proportion of magnetic flux that can contribute to torque generation. Therefore, in order to nevertheless achieve a desired torque, issues like cost increase, size increase and weight increase may arise. Also, the attempts to reduce torque variation by means of increased pole number may result in the increase of an electric angle per angular velocity of the motor due to the increased pole number. Therefore, decreased responsiveness may be problematic at lower rotational frequencies. Furthermore, a motor with smaller torque variation such as an induction motor can have a smaller torque density as compared with, for example, a brushless DC motor and therefore, its mountability may have to be sacrificed when size increase, weight increase and so on are inevitable.

It is known that, in a three-phase synchronous AC motor, there is a condition of a current phase that is less susceptible to torque variation. However, at such an angle of the current phase, a torque to effective current may decrease, thus possibly leading to increased motor loss and consequently resulting in increased heat generation as well as increased power consumption. Or, it may give rise to a possibility of decrease of the maximum torque that can be generated during energization with the maximum allowable level of current

SUMMARY OF THE INVENTION

An object of the present invention is to provide an electric brake device which can provide both a quiet operation with smaller torque variation for prioritizing NVH and a high torque operation or high output operation for prioritizing torque or output, by selectively using—based on requests—a control scheme that reduces torque variation and a control scheme that maximizes a torque.

To facilitate the understanding of the present invention, the following description of the present invention is expediently supplemented with reference signs from embodiments thereof.

An electric brake device 1 according to the present invention is to be installed to a vehicle. The electric brake device 1 includes an electric brake actuator 2 and a control unit 3. The electric brake actuator 2 includes: a brake rotor 31; a frictional member 32 configured to be brought into contact with the brake rotor 31; an electric motor 34; a frictional member actuator 33 configured to be driven by the electric motor 34 to bring the frictional member 32 into contact with the brake rotor 31; and a brake force estimator 37 configured to estimate a brake force that is being generated. The control unit 3 is configured to control the electric motor 34. The control unit 3 includes a brake force control processor 11 configured to perform follow-up control of the brake force that is estimated by the brake force estimator 37, with respect to a given target value. The control unit 3 also includes a motor current calculator 12 configured to calculate or determine a current value for driving the electric motor 34, in accordance with an output from the brake force control processor 11, with the current value being shiftable in response to a shifting command to one of: a value defined according to an output prioritizing control scheme that prioritizes a torque output; a value defined according to a torque variation suppressing control scheme that prioritizes smaller torque variation; and a value ranging between respective values defined according to these control schemes, with the control schemes representing motor control schemes that are available for performing the calculation or determination. The control unit 3 also includes an output requirement determiner 13 that is configured to calculate or determine a degree of importance of suppressing torque variation of the electric motor 34 according to a defined rule, based on one or both of a braking request that is given in the form of the target value and a travel condition of the vehicle that is obtained from a travel condition estimator, and that is configured to send the degree of importance to the motor current calculator 12 as the shifting command.

According to such a configuration, the output requirement determiner 13 may calculate a degree of importance of suppressing torque variation of the electric motor 34 according to the defined rule, based on one or both of the braking request and the travel condition. The motor current calculator 12 may selectively use, based on the degree of importance, the output prioritizing control scheme and the torque variation suppressing control scheme. Therefore, both a quiet operation with smaller torque variation for prioritizing NVH and a high torque operation or high output operation for prioritizing torque or output can be provided.

The braking request may for example comprise a target brake force, and the travel condition may for example comprise a wheel speed and/or a vehicle behavior. The output requirement determiner 13 may predict the importance of quietness that may be desired during a braking operation, from these target brake force, wheel speed and/or vehicle behavior or the like, and calculate the degree of importance of suppressing the torque variation. It should be noted that the brake force estimator 37 may comprise one or more types of sensors configured to detect a load acting on, for example, the frictional member actuator 33 and/or a motor current, or may comprise a module configured to estimate and calculate a brake force from other pieces of information.

In the present invention, the electric motor 34 may comprise a three-phase synchronous AC motor, and the torque variation suppressing control scheme may comprise an electric motor control scheme in which a current phase of the electric motor 34 is chosen to be a current phase that reduces a ratio of a magnitude of torque variation to a torque. The motor current calculator 12 may be configured to adjust the current phase, based on the calculation performed by the output requirement determiner 13, between a current phase that reduces the ratio of the magnitude of torque variation and a current phase that maximizes a torque. The expression "a ratio of a magnitude of torque variation to a torque" is, in other words, a "torque variation ratio." It is known that, in a three-phase synchronous AC motor, there is the condition of a current phase that is less susceptible to torque variation. Thus, by adjusting an angle of a current phase of the electric motor 34 when the electric motor 34 comprises a three-phase synchronous AC motor, the selective use of the aforementioned control schemes can be done more simply and more precisely.

In the present invention, the motor current calculator 12 may be applicable to vector control, and the electric motor control scheme in which a current phase that reduces the torque variation ratio is chosen may comprise controlling a magnitude of a d-axis current in such a way to adjust, based on the calculation performed by the output requirement determiner 13, the d-axis current between a d-axis current that maximizes a torque and a d-axis current that weakens field magnetic flux as compared with the d-axis current that maximizes the torque. The term "d-axis current" is meant to indicate a current component that weakens field magnetic flux. By utilizing a control method that is based on adjustment of a d-axis current, the selective use of the output prioritizing control scheme and the torque variation suppressing control scheme can be done more simply and more precisely.

In the present invention, the output requirement determiner 13 may be configured to estimate a rate of change of the target brake force representing the target value and configured to calculate so as to reduce the degree of importance of the torque variation suppressing control scheme if the rate of change exceeds a predetermined value and subsequently increases. The rate of change of the target brake force may be calculated, for example, using a change ratio that is obtained by a time derivative of the target brake force, or a variation frequency that is obtained by, for example, Fourier transformation of the target brake force. After the rate of change of the target brake force exceeds the predetermined value and as this rate of change subsequently increases, the motor may need to produce a correspondingly greater output. Since, as a consequence, an actuation noise of the motor cannot help but become louder, the importance of prioritizing motor torque variation for NVH may be relatively low. Therefore, by reducing the degree of importance of the torque variation suppressing control scheme and relying more on the output prioritizing control scheme, appropriate control that is suited to a given circumstance can be accomplished.

In such a configuration, the output requirement determiner 13 may be configured to calculate so as to reduce the degree of importance of the torque variation suppression if the rate of change of the target brake force drops below a different predetermined value that is smaller than the predetermined value and subsequently decreases. After the rate of change of the target brake force drops below the different predetermined value that is smaller than the predetermined value and as this rate of change subsequently decreases, it may become easier to reduce the effects of torque variation through the use of controllers. Accordingly, the torque variation suppression may be less urgent, and thus, the torque variation suppression may be less relied on.

In the present invention, the control unit 3 may include an anti-slip controller 16 configured to prevent an excessive level of slip with respect to a ground surface with which a wheel of the vehicle is in contact, and the output requirement determiner 13 may be configured to reduce the degree of importance of the torque variation suppression to a minimum thereof when anti-slip control is executed by the anti-slip controller 16. When anti-slip control is executed by the anti-slip controller 16, control promptness may be valued more. Therefore, it may be preferable to reduce the degree of importance of the torque variation suppression to a minimum thereof and enhance control promptness.

In the present invention, the output requirement determiner 13 may be configured to calculate so as to increase the degree of importance of the torque variation suppression if an estimated vehicle body speed that is obtained from a vehicle body speed estimator 38 associated with the vehicle drops below a second predetermined value and subsequently decreases. As the vehicle body speed decreases, generally, less road noise can be generated with an interior of the vehicle becoming quieter, and noise or vibrations caused by an electric brake can get more perceptible to passengers. Therefore, the importance of suppressing torque variation may be high. It should be emphasized that—especially when the vehicle is at stoppage—a delay in the operation of the electric brake device 1 will have almost no effect on the vehicle behavior. Accordingly, for example, a low pass filter with adequately low cut-off may be applied to the target brake force and reduce the rate of change of the target brake force. Then, smaller current consumption may be advantageously achieved by prioritizing output characteristics without accompanying NVH deterioration.

Any combination of at least two features disclosed in the appended claims and/or the specification and/or the accompanying drawings should be construed as being included within the scope of the present invention. In particular, any combination of at least two claims from the appended claims should be equally construed as being included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference signs are used to denote like parts or corresponding parts throughout the different figures, and:

FIG. 4 is an explanatory diagram illustrating an example of a degree of importance between torque variation and output characteristics, which may be used by an output requirement determiner in the electric brake device;

FIG. 7 is a set of graphs illustrating a relationship—between a target brake force, a rate of change of the target brake force and a vehicle body speed, on one hand, and a combination function thereof, on the other hand—which may be used in the electric brake device;

FIG. 9 is a set of graphs illustrating a change of a current and a change of a brake force over time, which can occur when a control scheme that minimizes torque variation is exclusively relied on; and FIG. 10 is a set of graphs illustrating a change of a current and a change of a brake force over time, which can occur when a control scheme that maximizes output characteristics is exclusively relied on.

DESCRIPTION OF EMBODIMENTS

Figure 1:
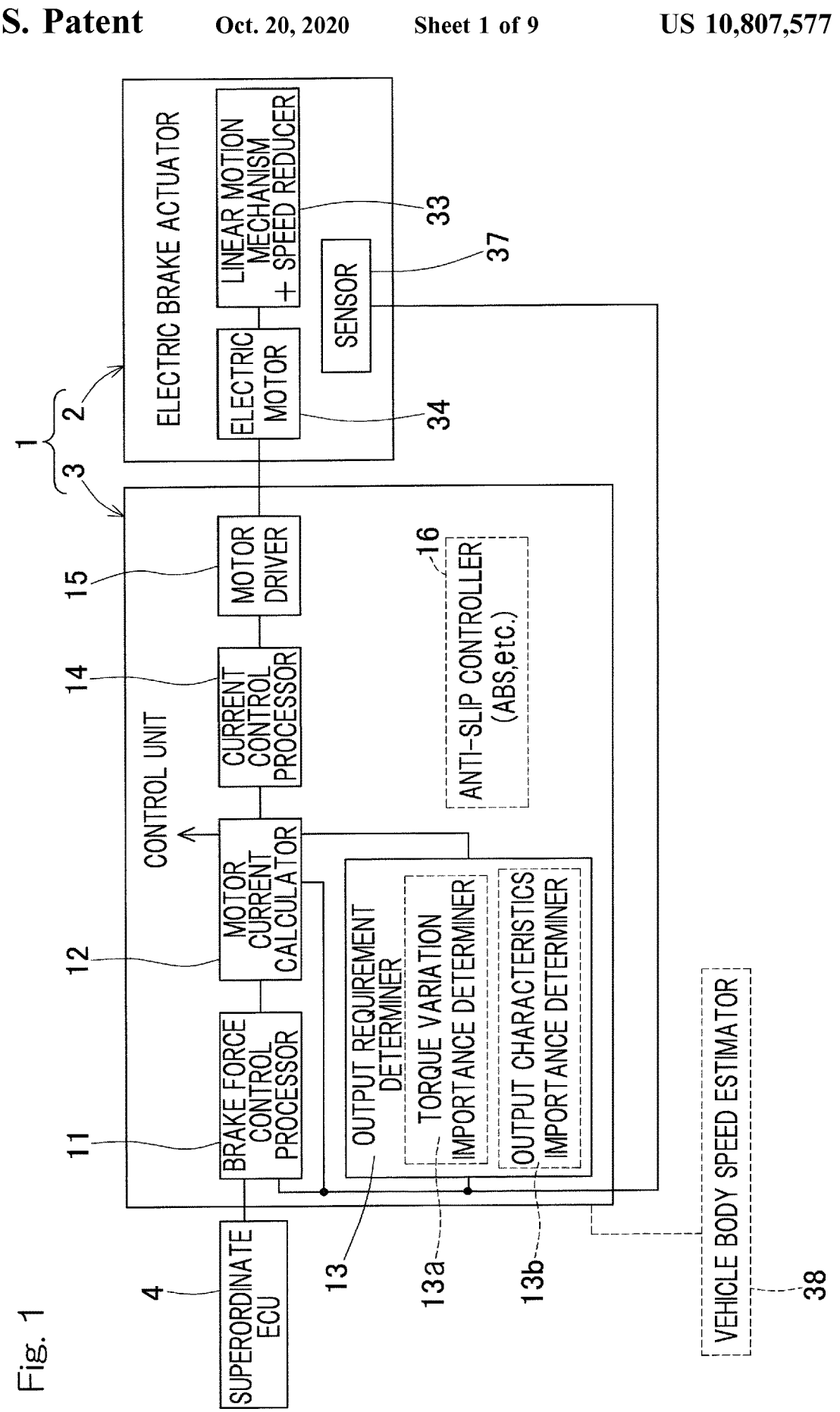
FIG. 1 is a block diagram illustrating the conceptual configuration of a control system for an electric brake device, in accordance with an embodiment of the present invention.

An embodiment of the present invention will be described in connection with the accompanying drawings. Referring to FIG. 1, an illustrated electric brake device 1 may include an electric brake actuator 2 that represents mechanical components thereof and a control unit 3 configured to control the electric brake actuator 2. The electric brake device 1 and a superordinate ECU 4 may cooperate to form an electric brake system. The superordinate ECU 4 may comprise an electronic control unit that can serve the function of generating a braking command based on an amount of operation—for example, depressing operation—of a brake operation unit (not shown) such as a brake pedal and of allocating the braking command among respective electric brake devices 1 on a vehicle. For example, the superordinate ECU 4 may take the form of a main ECU that can serve the function of performing cooperative control and/or supervisory control of the vehicle as a whole and of performing output control of an internal combustion engine of the vehicle or a traction drive source such as an electric motor according to an amount of operation of an accelerator operation unit (not shown) such as an accelerator pedal. It should be emphasized that the superordinate ECU 4 may take the form of an ECU that is dedicated exclusively to brake control purpose.

Figure 3:
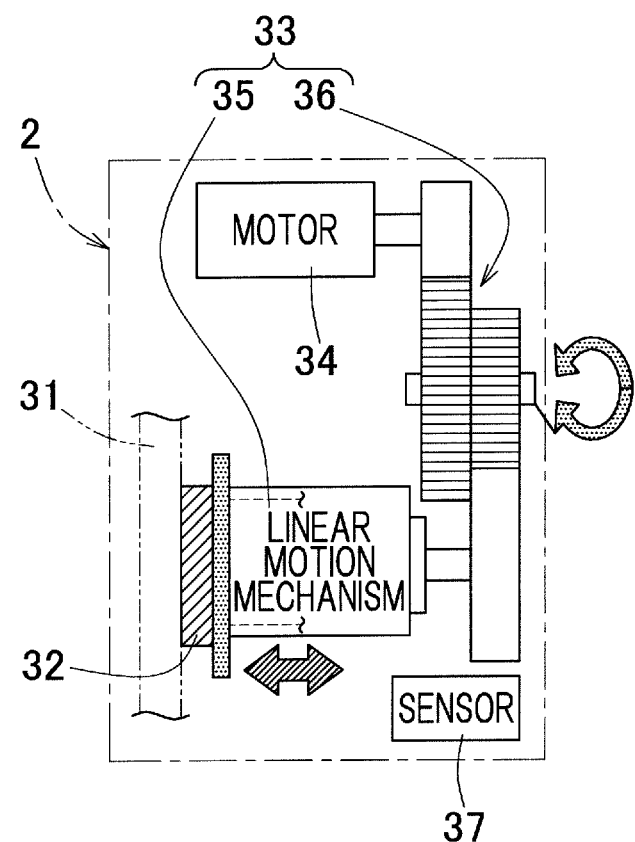
FIG. 3 is an explanatory diagram illustrating an example of an electric brake actuator of the electric brake device.

For example as shown in FIG. 3, the electric brake actuator 2 may include: a brake rotor 31; a frictional member 32, such as a friction pad, that is configured to be brought into contact with the brake rotor 31; an electric motor 34; a frictional member actuator 33 configured to be driven by the electric motor 34 to bring the frictional member 32 into contact with the brake rotor 31; and a sensor 37 configured to detect various motions of the electric brake actuator 2. The brake rotor 31 may be coupled integrally to a wheel (not shown) of the vehicle—i.e., a vehicle to which the electric brake device 1 can be installed—in such a way that the brake rotor 31 can rotate with the wheel. The frictional member actuator 33 may include a linear motion mechanism 35 configured to convert a rotary motion to a linear motion and a speed reducer 36 configured to transmit rotation of the electric motor 34, at a reduced speed, to the linear motion mechanism 35. The linear motion of the linear motion mechanism 35 can cause the frictional member 32 to be pressed against the brake rotor 31. The linear motion mechanism 35 can comprise, for example, a lead screw mechanism or a ball ramp mechanism. The speed reducer 36 may advantageously comprise parallel gears as they are inexpensive, but may nevertheless comprise, for example, a worm gear or a planetary gear. The electric motor 34 may for example comprise a three-phase synchronous AC motor, but may nevertheless advantageously comprise a brushless DC motor having a rotor with permanent magnet(s) since this enables the construction of a fast and compact electric servo system.

The sensor 37, which may be an estimator configured to detect various motions of the electric brake actuator 2, can be formed of a group of sensors and is collectively shown as a single, unitary sensor 37. The sensor 37 may advantageously comprise, for example, a motor angle sensor, a motor current sensor and a brake force sensor, as they enable the implementation of a fast and precise control system for the electric brake. For example, the motor angle sensor may comprise an encoder or a resolver, and the current sensor may comprise a shunt resistor or a Hall element, and the brake force sensor may comprise a Hall element or a strain sensor. In this way, they can be installed in inexpensive and space-saving manner. For this reason, it may be advantageous to employ them, but the sensor 37 may instead be designed to perform sensorless estimation without relying on special sensor devices. One or more components of the sensor 37 may estimate or cooperate to estimate a brake force that is being generated by the electric brake device and can therefore serve as the aforementioned brake force estimator.

Referring again to FIG. 1, the control unit 3 may include a brake force control processor 11 that can perform follow-up control of an estimated brake force with respect to a required target value for the brake force, a motor current calculator 12 that can compute a required current from a motor torque required for the follow-up control of the brake force, an output requirement determiner 13 that can select which characteristics of the motor should be prioritized, a current control processor 14 that can be configured to perform follow-up control of a motor current, and a motor driver 15 that can be configured to energize motor coils of the electric motor 34.

Each of the modules from the brake force control processor 11 to the current control processor 14 of the control unit 3 or the entirety of the control unit 3 except the motor driver 15 may be implemented by using, for example, a microcomputer, an ASIC, an FPGA or a DSP. The motor driver 15 may be realized by using switching elements such as MOSFETs and may include a pre-driver for instantly driving the switching elements.

The brake force control processor 11 may perform the follow-up control of the estimated brake force, based on an estimation result of a brake force that is provided by the brake force estimator 37. The current control processor 14 may perform the follow-up control of the motor current by using a detection value of, for example, a current sensor that can detect a motor current of the electric motor 34 in the electric brake actuator 2. The current control processor 14 may be configured to be capable of vector control.

The motor current calculator 12 may calculate or determine—from piece(s) of information obtained from the sensor 37 in the electric brake actuator 2 such as a motor torque or a value corresponding to a motor torque and a motor angular velocity—a motor current as well as a current phase or a d-axis current value and/or a q-axis current value with which the motor torque can be produced. A torque equation of the electric motor may be used to compute or calculate these current values in the motor current calculator 12, but it may be advantageous to store a table of corresponding parameters in advance, as this can reduce computational load.

The motor current calculator 12 may calculate a current value for driving the electric motor 34, in accordance with an output from the brake force control processor 11, with the current value being shiftable in response to a shifting command from an external component, to one of: a value defined according to an output prioritizing control scheme that prioritizes a torque output; a value defined according to a torque variation suppressing control scheme that prioritizes smaller torque variation; and a value ranging between respective values defined according to these control schemes, with the control schemes representing motor control schemes of the electric motor 34 that are available for performing the calculation or determination.

The torque variation suppressing control scheme that may be operated in the motor current calculator 12 may comprise an electric motor control scheme in which a current phase of the electric motor 34 is calculated to be a current phase that reduces a torque variation ratio which is defined as a ratio of a magnitude of torque variation to a torque. The motor current calculator 12 may be configured to adjust the current phase between a current phase that reduces the ratio of the magnitude of torque variation and a current phase that maximizes a torque, based on the calculation or determination performed by the output requirement determiner 13.

The motor current calculator 12 may have vector control functionality, and the electric motor control scheme in which a current phase that reduces the torque variation ratio is employed may comprise controlling a magnitude of a d-axis current which is a current component that weakens field magnetic flux, in such a way to adjust, based on the calculation or determination performed by the output requirement determiner 13, the d-axis current between a d-axis current that maximizes a torque and a d-axis current that weakens field magnetic flux as compared with the d-axis current that maximizes the torque.

The output requirement determiner 13 may calculate or determine a degree of importance of suppressing torque variation of the electric motor 34 according to a defined rule, based on one or both of a braking request that is given in the form of the aforementioned target value and a travel condition of the vehicle that is obtained from a travel condition estimator (e.g., the brake force estimator and/or a vehicle body speed estimator) and may send the degree of importance to the motor current calculator 12 as the shifting command.

The defined rule, which may be defined based on, for example, experiment results, simulation results, measurement results and previous experiences, may provide a weighting ratio between the aforementioned braking request and the aforementioned travel condition. The degree of importance may be quantified, for example, as an absolute value or a relative value, so that different levels of importance that vary under different circumstances or in different moments can be compared with each other.

The output requirement determiner 13 may include a torque variation importance determiner 13a and an output characteristics importance determiner 13b, which may determine, from the required brake power or sensor detection values, a degree of importance of NVH and a degree of importance of response as well as power characteristics in brake activation state at present, respectively. These determiners 13a, 13b may be discrete determiners. Alternatively, only one of them may be provided to produce one determination and the other determination may, at the same time, be the opposite of this determination.

The output requirement determiner 13 may perform, in addition to the aforementioned function, a function of estimating a rate of change of the target brake force representing the target value and a function of calculating so as to reduce the degree of importance of the torque variation suppressing control scheme if the rate of change exceeds a predetermined value and subsequently increases. After the rate of change of the target brake force exceeds the predetermined value and as this rate of change subsequently increases, the motor may need to produce a correspondingly greater output. Since, as a consequence, the actuation noise of the motor cannot help but become louder, the importance of prioritizing motor torque variation for NVH may be relatively low. Therefore, by reducing the degree of importance of the torque variation suppressing control scheme and relying more on the output prioritizing control scheme, appropriate control that is suited to the given circumstance can be accomplished.

In such a configuration, the output requirement determiner 13 may calculate so as to reduce the degree of importance of the torque variation suppression if the rate of change of the target brake force drops below a different predetermined value that is smaller than the predetermined value and subsequently decreases. After the rate of change of the target brake force drops below the different predetermined value that is smaller than the predetermined value and as this rate of change subsequently decreases, it may become easier to reduce the effects of torque variation through the use of controllers. Accordingly, the torque variation suppression may be less urgent, and thus, the torque variation suppression may be less relied on.

Furthermore, the control unit 3 may include an anti-slip controller 16 configured to prevent an excessive level of slip with respect to a ground surface with which a wheel of the vehicle is in contact, and the output requirement determiner 13 may reduce the degree of importance of the torque variation suppression to a minimum thereof when anti-slip control is executed by the anti-slip controller 16. The anti-slip controller 16 may for example comprise an ABS (Antilock Brake System).

Figure 2:
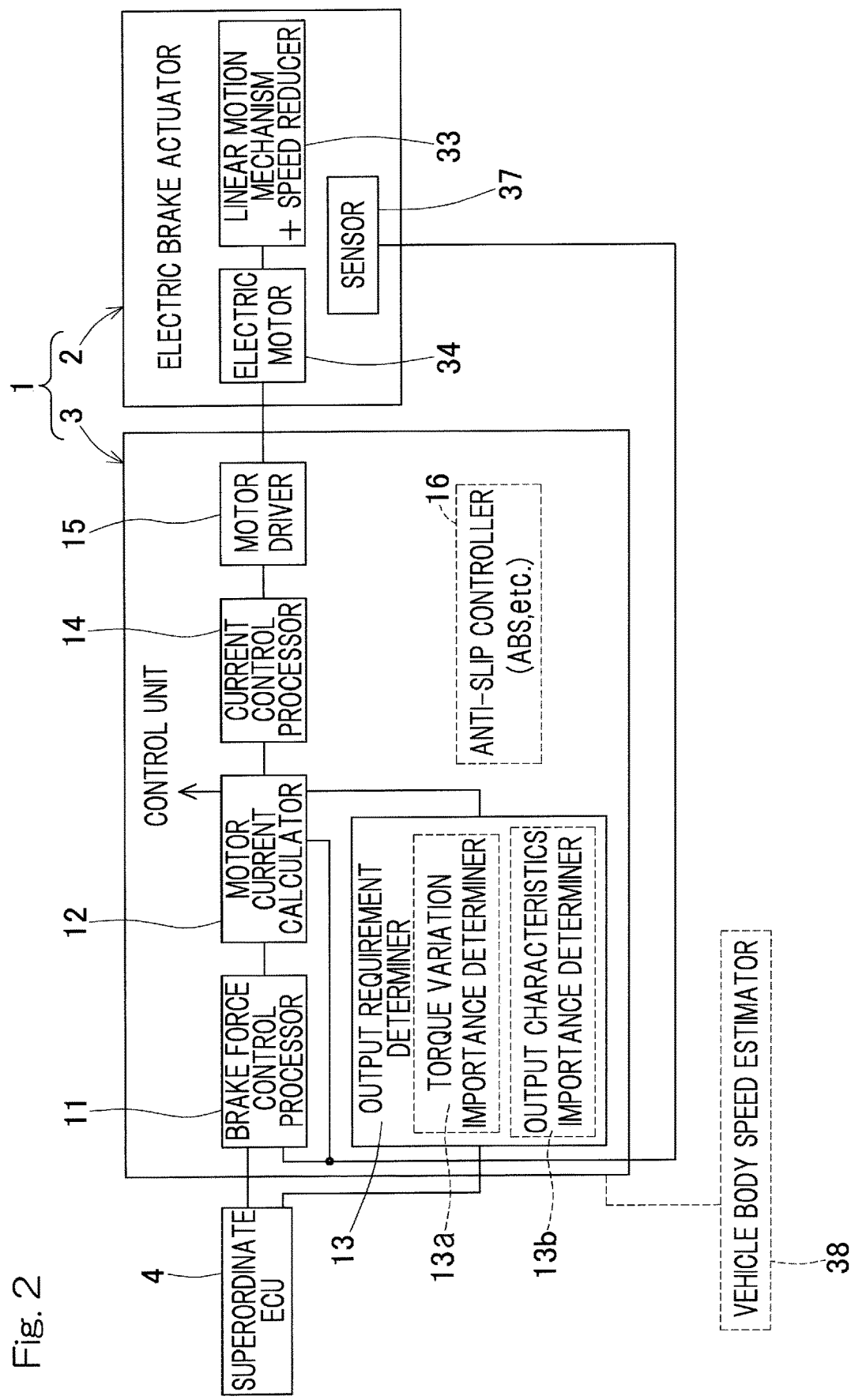
FIG. 2 is a block diagram of a variant of FIG. 1.

The output requirement determiner 13 may also perform a function of calculating so as to increase the degree of importance of the torque variation suppression if an estimated vehicle body speed that is obtained from a vehicle body speed estimator 38 associated with the vehicle drops below a second predetermined value and subsequently decreases. It should be noted that the predetermined value as well as the second predetermined value may be defined based on, for example, experiment results, simulation results, measurement results and previous experiences, It should also be noted that, although the output requirement determiner 13 in the example of FIG. 1 is designed to use piece(s) of information obtained from the sensor 37 in the electric brake actuator 2 to execute its operations, the output requirement determiner 13 may instead be designed to use, for example, piece(s) of information that is/are given from the superordinate ECU 4 such as shown in a variant of FIG. 2 to execute its operations.

FIG. 4 illustrates an example of the degree of importance between torque variation and output characteristics, which may be used by the output requirement determiner 13 that is illustrated in FIG. 4 in order to perform its calculation. In the figure, the degree of importance is expressed in the order from highest to lowest as "Very Important," "Important" and "Less Important." As far as the vehicle speed is concerned, the actuation noise of the electric brake actuator 2 generally gets more perceptible at lower vehicle speeds. Therefore, NVH may get more important—that is, smaller torque variation may get more important, and the importance of output characteristics may be low because the travel distance of the vehicle per braking time is shorter. At higher vehicle speeds, on the other hand, the opposite trend to the trend mentioned above takes place. Yet, when the vehicle is virtually at stoppage—for example, when the vehicle is at stoppage at a traffic light—the electric brake device may be activated for an extended period of time as compared with braking time. In such a case, the importance of output characteristics may become high because a smaller current per torque is more desirable for reduced power consumption. When the vehicle is at stoppage, a delay in the operation of the electric brake device will have almost no effect on the vehicle behavior. Accordingly, to counteract NVH in such a case, for example, a low pass filter (not shown) with adequately low cut-off may be applied to the target brake force, so that the filtered, target brake force will subsequently be inputted to the control unit 3. With the aid of such a filtering operation, output characteristics can be advantageously prioritized without accompanying NVH deterioration.

As far as the target brake force is concerned, the current loss is generally proportional to a square of a current. Therefore, in range of higher braking forces where a greater torque is needed, the importance of output characteristics of the motor may be proportionally higher. Torque variation may generally be important in any of the different range.

As far as the rate of change of the target brake force is concerned, generally, a higher disturbance attenuation effect may act in a feedback control system at lower operating frequencies. Therefore, in range of smaller rates of change of the target brake force, the importance of torque variation may be lower. As the rate of change of the target brake force increases and, consequently, as the operating frequency of the brake control system increases, the disturbance attenuation effect may scale down. Accordingly, the importance of torque variation may become higher. As the rate of change of the target brake force further increases, however, the rate of change of the target brake force itself may start to have a major influence on NVH deterioration. Thus, the importance of torque variation may slightly drop. As for output characteristics, on the other hand, in general, as the rate of change of the target brake force increases, the importance of output characteristics may become correspondingly higher in order to keep performance of following of the brake force.

Ultimately, each degree of importance of torque variation and output characteristics may need to be defined by taking into account all of possible combinations of the aforementioned cases. Here, in those cases where both of torque variation and output characteristics are important, output characteristics may advantageously be prioritized if safety is taken into consideration, but it may be appropriately decided by a designer so that it can be adapted to respective conceivable circumstances.

Figure 5A:
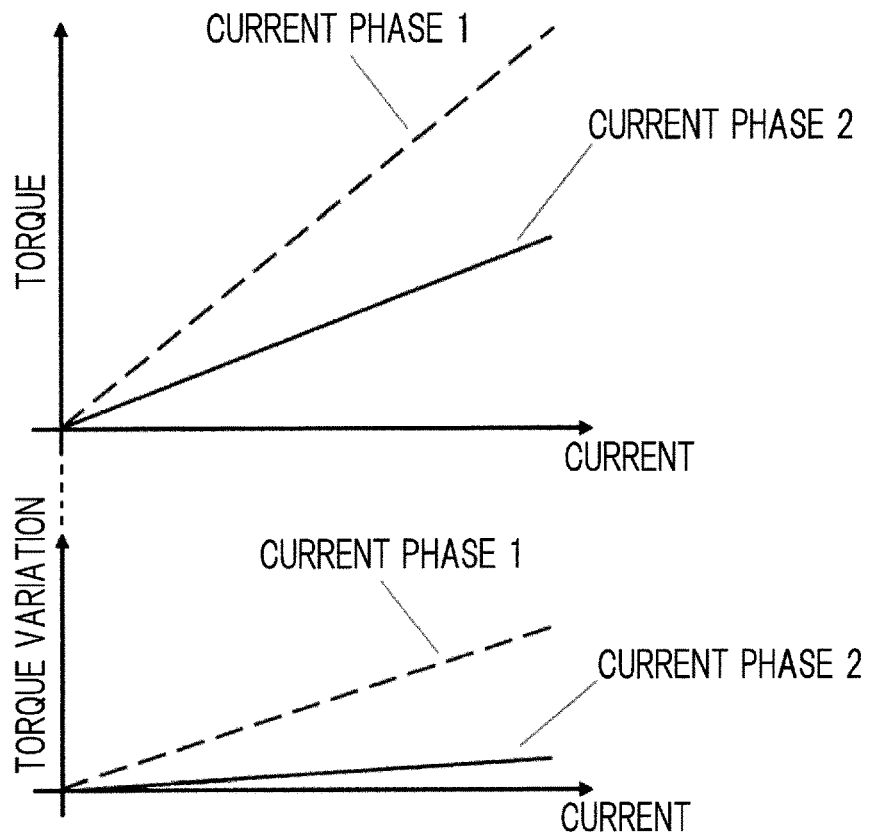
FIG. 5A is a set of graphs illustrating a relationship between current phases and a torque as well as torque variation.
Figure 5B:
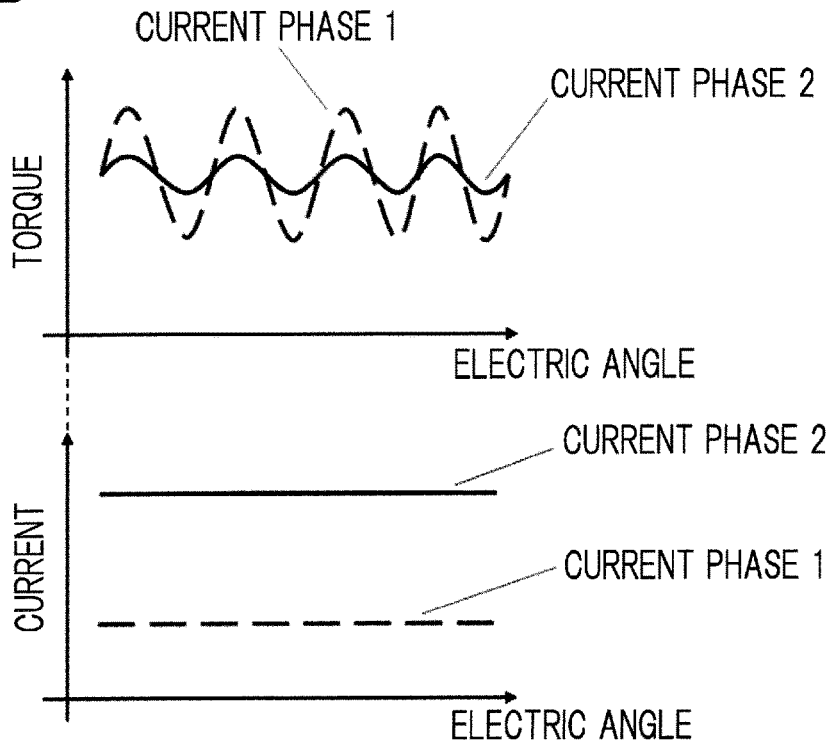
FIG. 5B is a set of graphs illustrating the relationship between current phases and a torque as well as a current.

FIG. 5A and FIG. 5B are a conceptual diagram of a motor torque and torque variation, and a conceptual diagram of a motor torque and a current, respectively, for each of different current phases. In the figures, a current phase refers to the phase of a sinusoidal current with respect to the phase of a magnetic pole in the three-phase synchronous AC motor. CURRENT PHASE 1 indicates the phase at which, for example, a torque to current is maximized, while CURRENT PHASE 2 indicates a current phase at which torque variation has been adjusted to be smaller than that of CURRENT PHASE 1. FIG. 5A shows a correlation between a torque as well as torque variation and an effective current for each of these current phases. A torque to current at CURRENT PHASE 2 is lower than at CURRENT PHASE 1 and therefore a maximum torque lowers, thereby resulting in increased power consumption per torque. On the other hand, smaller torque variation can be achieved. FIG. 5B shows torque variation and a current as a function of an electric angle. CURRENT PHASE 2 can result in torque variation that is greater than that of CURRENT PHASE 1 as the electric angle changes.

Figure 6:
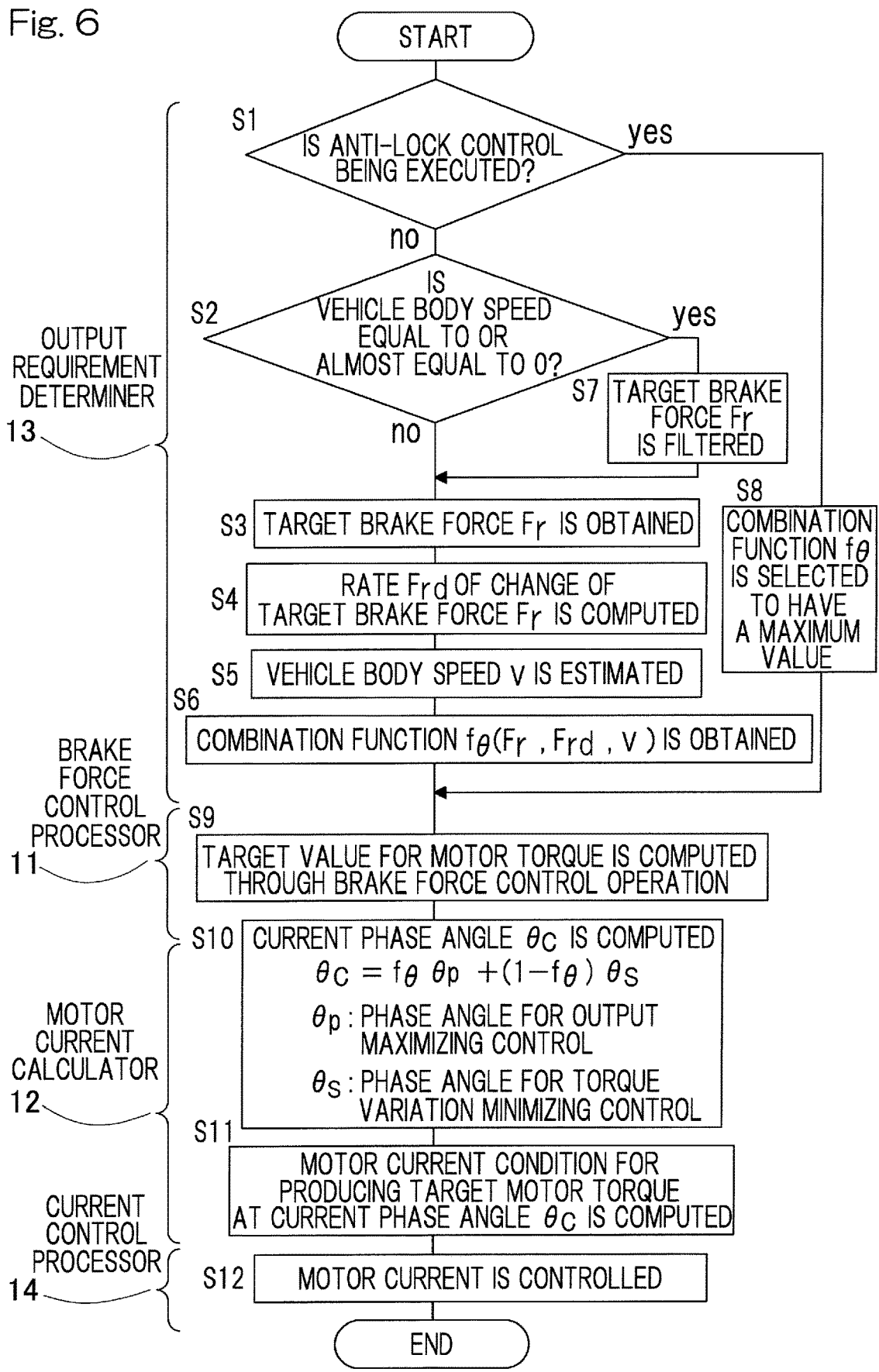
FIG. 6 is a flow chart illustrating process steps that may be performed by the output requirement determiner, a motor current calculator and others in the electric brake device.

FIG. 6 is a flow chart illustrating current control that may be carried out in the electric brake device 1. Step 1 to Step 8 indicate process steps that may be performed by the output requirement determiner 13 that is illustrated in FIG. 1. Step 9 indicates a process step that may be performed by the brake force control processor 11. Step 10 to Step 11 indicate process steps that may be performed by the motor current calculator 12. Step 12 indicates a process step that may be performed by the current control processor 14.

In Step 1, the output requirement determiner 13 may determine whether or not to execute anti-lock control. While anti-lock control is being executed, a combination function may be selected so as to prioritize output characteristics to the maximum degree (Step S8). Then, it may proceed to Step S9. If, in Step S1, it is determined not to execute anti-lock control, the output requirement determiner 13 may determine whether the vehicle body speed is zero (stoppage) or is very low (Step 2). If it is determined that the vehicle body speed is zero or is very low, it may proceed to Step S7 in which filtering is applied to the target brake force $F_r$ so as to adequately slow it down. Subsequently, it may proceed to Step S3.

If, in Step S2, it is determined that the vehicle body speed is neither zero nor is very low, it may proceed directly to Step 3 in which the output requirement determiner 13 obtains the target brake force $F_r$, and the output requirement determiner 13 may derive a rate $F_{rd}$ of change of the target brake force $F_r$ (Step 4). The rate $F_{rd}$ of change of the target brake force may be calculated, for example, from a time derivative of the target brake force, or a peak frequency that is generated by Fourier transformation thereof. Subsequently, the output requirement determiner 13 may obtain an estimated vehicle body speed v (Step S5), and it may subsequently proceed to Step S6.

In step S6, the output requirement determiner 13 may derive a combination function $F_\theta$ that is set or calculated based on the target brake force, the rate of change of the target brake force and the vehicle body speed. Respective combined functions, which may for example be defined as those functions shown in (A), (B) and (C) of FIG. 7, can be combined by addition and/or multiplication to generate a different combination function.

In this way, the output requirement determiner 13 may provide a determination result that is calculated as the combination function $F_\theta$ and may send the determination result to the motor current calculator 12.

In step S9, the brake force controller 11 may compute a motor torque for causing a brake force to follow a target value. This control operation of the computing may be implemented, for example, by feedback control, or by feed-forward control based on a model of the brake actuator and others. The brake force controller 11 may send the motor torque that is computed in Step S9 to the motor current calculator 12.

In Step S10, the motor current calculator 12 may compute a current phase angle $\theta_c$. The current phase angle $\theta_c$, which may be defined as one of a phase angle $\theta_p$ that produces a maximum output, a phase angle $\theta_s$ that achieves minimum torque variation, and an intermediate value therebetween, may be computed using the aforementioned combination function according to, for example, the following equation:

$$\theta_c = f_\theta\ \theta_p + (1 - f_\theta)\theta_s$$

Instead of using this equation for computation, for example, a threshold may be employed for the combination function and may be used to select either one of the phase angle that produces the aforementioned maximum output and the phase angle that achieves the minimum torque variation, based on upward or downward crossing of the threshold.

It should be emphasized that, although the embodiment under discussion deals with current phase-based control, d-axis current and q-axis current values may instead be used to carry out operations equivalent to the aforementioned operations to select by, for example, designing the current control processor 14 to be applicable to vector control.

After computing the current phase angle $\theta_c$ in the aforementioned manner, the motor current calculator 12 may, in step S11, compute a target current for producing a target motor torque at the current phase angle $\theta_c$. Using the computed target current, the current control processor 14 may control a motor current of the electric motor 34 (step S12).

Figure 8:
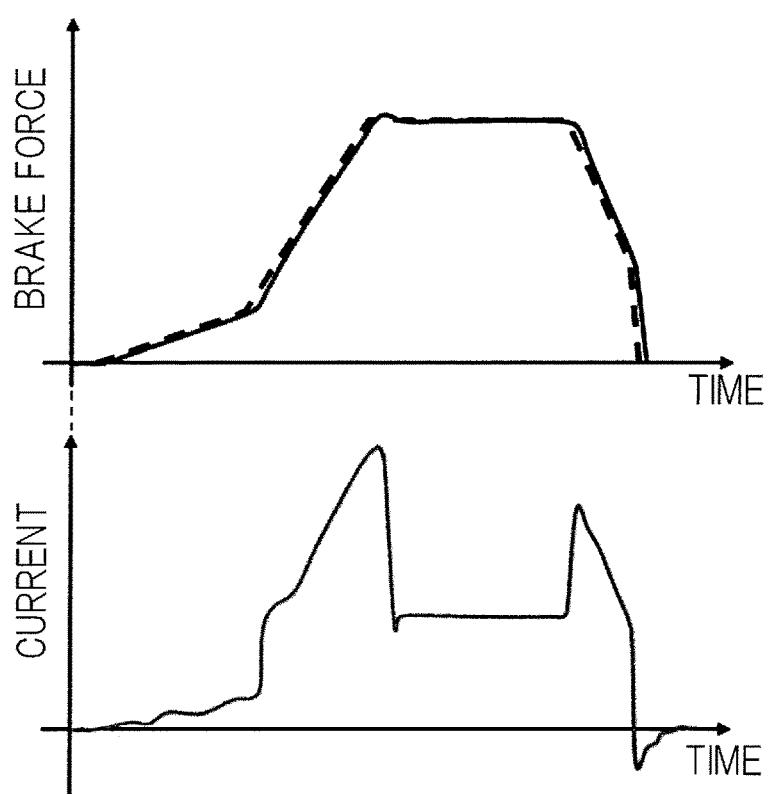
FIG. 8 is a set of graphs illustrating a change of a current and a change of a brake force over time, which may occur when the electric brake device in accordance with the embodiment is employed.
Figure 9:
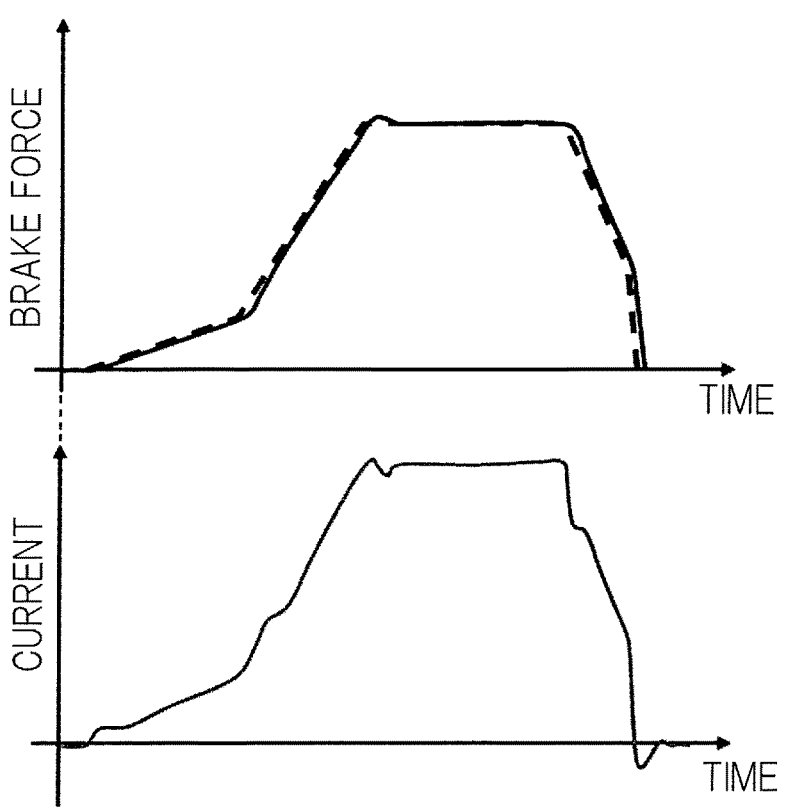
Figure 10:
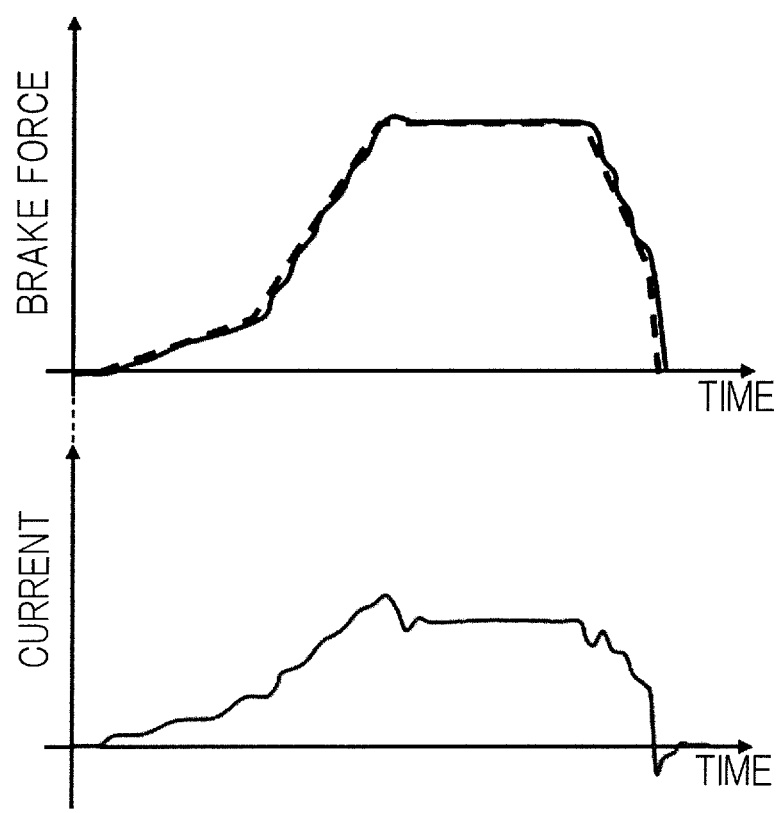

FIG. 8 to FIG. 10 illustrate examples of operation of the electric brake device 1 for hereinafter-described control scenarios. FIG. 8 concerns an example of the control scenario where the embodiment under discussion is implemented. In the upper one of the graphs in each of these figures—i.e., a graph depicting a curve of a brake force—a broken line indicates a target value and a solid line indicates a measured value. FIG. 9 concerns an example of the control scenario where the torque variation-minimizing scheme is exclusively relied on. The current value in this example is greater than that of the embodiment under discussion (FIG. 8), thereby resulting in increased current consumption. FIG. 10 concerns an example of the control scenario where the output characteristics-maximizing scheme is exclusively relied on. The response waveform of a brake force in this example is oscillatory as compared with that of the embodiment under discussion (FIG. 8) or that of the control scenario where the torque variation-minimizing scheme is exclusively relied on (FIG. 9).

The brake force control processor 11, motor current calculator 12, output requirement determiner 13 and anti-slip controller 16 may be specifically realized by a hardware circuitry or software functions on a processor (not shown) which can perform computations and can output results by using a LUT (Look Up Table) implemented by software and/or hardware, or by using, for example, a set of predetermined transform functions stored in a software library (Library) and/or hardware equivalent thereto and, if necessary, using, for example, comparison functions and arithmetic operation functions in the library and/or hardware equivalent thereto.

As such, with the embodiment under discussion, a quiet operation with smaller torque variation for prioritizing NVH and a high torque operation or high output operation for prioritizing torque or output, can both be provided by selectively using—based on requests—a control scheme that reduces torque variation and a control scheme that maximizes a torque.

Preferred implementations of the present invention have thus far been shown and described in connection with embodiments with reference to the accompanying drawings, but those embodiments disclosed herein are only illustrative, non-limiting examples in all respects. The scope of the present invention is not defined by the foregoing description but by the appended claims. Those skilled in the art would readily conceive numerous variants and modifications upon reading the instant specification, without departing from the obvious scope and sprit of the invention. Accordingly, such variants and modifications should be construed as being encompassed within the scope of the present invention that is defined by the appended claims or within a scope of equivalency thereof.

REFERENCE NUMERALS

1 . . . electric brake device
2 . . . electric brake actuator
3 . . . control unit
4 . . . superordinate ECU
11 . . . brake force control processor
12 . . . motor current calculator
13 . . . output requirement determiner
14 . . . current control processor
16 . . . anti-slip controller
31 . . . brake rotor
32 . . . frictional member
33 . . . frictional member actuator
34 . . . electric motor
35 . . . linear motion mechanism
36 . . . speed reducer
37 . . . sensor (brake force estimator)
38 . . . vehicle body speed estimator

What is claimed is:

1. An electric brake device to be installed to a vehicle, the electric brake device comprising:
   an electric brake actuator, the electric brake actuator including:
   a brake rotor;
   a frictional member configured to be brought into contact with the brake rotor;
   an electric motor;
   a frictional member actuator configured to be driven by the electric motor to bring the frictional member into contact with the brake rotor; and
   a brake force estimator configured to estimate a brake force that is being generated; and
   a control unit configured to control the electric motor, the control unit including:
   a brake force control processor configured to perform follow-up control of the brake force that is estimated by the brake force estimator, with respect to a given target value;
   a motor current calculator configured to calculate a current value for driving the electric motor, in accordance with an output from the brake force control processor, the current value being shiftable in response to a shifting command to a value defined according to a torque variation suppressing control scheme that prioritizes smaller torque variation, the control scheme representing a motor control scheme that is available for performing the calculation; and
   an output requirement determiner configured to calculate a degree of importance of suppressing torque variation of the electric motor according to a defined rule, based on one or both of a braking request that is given in the form of the target value and a travel condition of the vehicle that is obtained from a travel condition estimator, and configured to send the degree of importance to the motor current calculator as the shifting command.

2. The electric brake device as claimed in claim 1, wherein the control unit includes an anti-slip controller configured to prevent an excessive level of slip with respect to a ground surface with which a wheel of the vehicle is in contact, and wherein the output requirement determiner is configured to reduce the degree of importance of the torque variation suppression to a minimum thereof when anti-slip control is executed by the anti-slip controller.

3. The electric brake device as claimed in claim 1, wherein the output requirement determiner is configured to calculate so as to increase the degree of importance of the torque variation suppression if an estimated vehicle body speed that is obtained from a vehicle body speed estimator associated with the vehicle drops below a second predetermined value and subsequently decreases.

4. The electric brake device as claimed in claim 1, wherein the electric motor comprises a three-phase synchronous AC motor, wherein the torque variation suppressing control scheme comprises an electric motor control scheme in which a current phase of the electric motor is chosen to be a current phase that reduces a torque variation ratio which is defined as a ratio of a magnitude of torque variation to a torque, and wherein the motor current calculator is configured to adjust the current phase, based on the calculation performed by the output requirement determiner, between a current phase that reduces the ratio of the magnitude of torque variation and a current phase that maximizes a torque.

5. The electric brake device as claimed in claim 4, wherein the motor current calculator is applicable to vector control, and wherein the electric motor control scheme in which a current phase that reduces the torque variation ratio is chosen comprises controlling a magnitude of a d-axis current in such a way to adjust, based on the calculation performed by the output requirement determiner, the d-axis current between a d-axis current that maximizes a torque and a d-axis current that weakens field magnetic flux as compared with the d-axis current that maximizes the torque.

6. The electric brake device as claimed in claim 1, wherein the output requirement determiner is configured to estimate a rate of change of the target brake force representing the target value and is configured to calculate so as to reduce the degree of importance of the torque variation suppressing control scheme if the rate of change exceeds a predetermined value and subsequently increases.

7. The electric brake device as claimed in claim 6, wherein the output requirement determiner is configured to calculate so as to reduce the degree of importance of the torque variation suppression if the rate of change of the target brake force drops below a different predetermined value that is smaller than the predetermined value and subsequently decreases.

* * * * *